F. G. LORENZEN.
FOOD PRODUCT AND METHOD OF PREPARING THE SAME.
APPLICATION FILED MAR. 30, 1918.

1,358,960.   Patented Nov. 16, 1920.

Inventor
Frederick G. Lorenzen
By Rector, Hibben, Davis & Macauley
His Attys

UNITED STATES PATENT OFFICE.

FREDERICK G. LORENZEN, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

FOOD PRODUCT AND METHOD OF PREPARING THE SAME.

1,358,960.   Specification of Letters Patent.   Patented Nov. 16, 1920.

Application filed March 30, 1918. Serial No. 225,816.

*To all whom it may concern:*

Be it known that I, FREDERICK G. LORENZEN, a subject of the Emperor of Germany, residing at Battle Creek, in the county of Calhoun and State of Michigan, U. S. A., have invented certain new and useful Improvements in Food Products and Methods of Preparing the Same, of which the following is a specification.

My invention relates to a food product formed from corn starch or other starchy materials of various sorts, and the process of forming such product by a series of mechanical and thermal operations. In some respects my process is a modification or variation of the process of forming a product consisting of small compact globules or pellets described in Patent No. 1,211,462, issued January 9, 1917, upon application of Frederick G. Lorenzen, but through such modification the herein described product is given a different physical structure which renders it entirely distinct as a comestible, and suitable for different uses and purposes. The object of my invention is the commercial production of wholesome food which may be prepared from relatively cheap materials, such as corn starch or potato starch, and which shall have a palatable taste and form an acceptable substitute for the more expensive wheat products.

While my invention may be carried out by the use of any suitable apparatus, I have illustrated in a drawing forming part of this application suitable machines for carrying out certain steps of the process, the machines themselves, however, forming no part of my invention.

Figure 1:
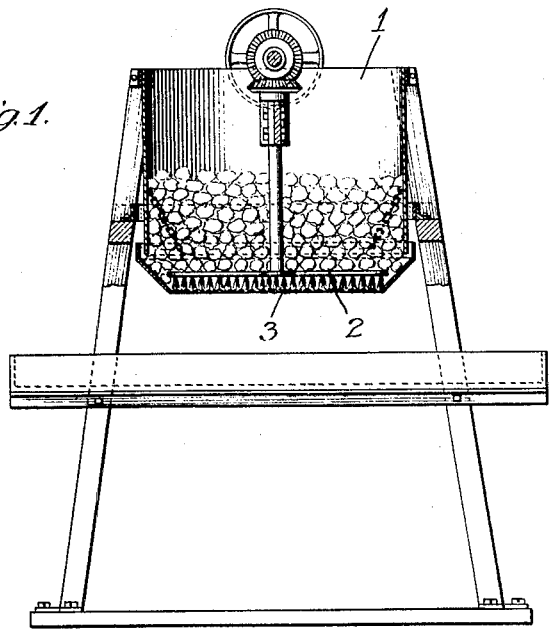
Figure 2:
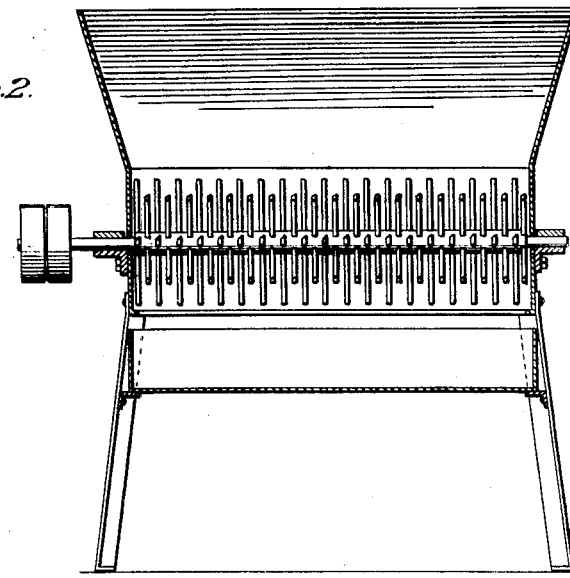

In the drawing, Figure 1 is a central vertical section of a machine suitable for accomplishing the step of flaking the moistened raw material, certain parts being shown in elevation; and Fig. 2 is a similar view of a grinding or shredding machine for reducing the cooked material to small pieces or lumps.

My new food product may be prepared from corn starch or corn flour, as well as from potato starch or other starches, flours, or finely ground starchy materials capable of being flaked and cooked by steam as hereinafter described. The material to be used is first thoroughly mixed with water, preferably by means of a suitable mixer, thirty-five to forty per cent. of water being used in the case of corn starch, and the moistened mass, allowed to stand for a time,—in practice from ten to twelve hours,—by which treatment it is converted into a stiff moist cake which is capable of granulation. The cake, broken into pieces of convenient size is then fed to the hopper 1 of the flaking machine, where, by the action of the revolving brushes 2 the wet starch is scraped against and through the mesh or screen 3 which forms the bottom of the hopper, and by the action of the brushes is cut in such manner that it is converted as it passes through the screen into a mass of small angular fragments or flake-like particles of various sizes. These flakes are then placed in shallow wire screen cooking pans and the pans placed in a steam retort where they are cooked for about twenty minutes under a steam pressure of from five to fifteen pounds, the time and pressure varying somewhat according to the amount of cooking desired. The steam should be somewhat superheated so as to be free of moisture. The cooking step is preferably carried to a state of incipient or partial gelatinization only, in which state the resultant product is more soluble and adapted for a wider range of use, although if desired the cooking may be carried further, producing a less soluble product.

After cooking, the mass of cooked particles is allowed to cool and then put through a revolving grinding or cutting machine provided with knives which shred the mass into small fragments or lumps. These lumps are now subjected to a thorough drying process by which all moisture is driven off and the lumps prepared for grinding. In practice any suitable commercial drying apparatus by means of which the comminuted mass can be thoroughly and effectively dried may be used. After the drying operation the dried lumps are ground and granulated into particles of approximately uniform size, preferably about the fineness of coarse corn meal. The finished product, produced as thus described, is nearly though not quite opaque and of a milky white color, and is quickly acted upon by moisture and heat in preparing it for the table, since in the process of manufacture the material used is neither compacted nor kneaded into a dense cohesive mass, and the particles are therefore relatively porous. If desired, sugar or flavoring and seasoning materials of various kinds, as well as harmless coloring matter, may be incorporated in preparing the starch cake for granulating, in order to produce a product of particular appearance or flavor.

In following the process described in my prior patent above referred to, the moist raw starch cake flakes are tumbled in a rotary drum to transform the granular flakes into globular pellets. In the commercial practice of such prior invention it occasionally happens that a portion of the flaked material is imperfectly acted upon, and this material, instead of being worked up into a new raw starch cake, as suggested in my prior patent, may be cooked, dried and ground as above described, to form the granulated product to which the present invention relates.

As above stated, my novel food product can be prepared from corn, and can therefore be sold considerably cheaper than wheat products, and the corn flavor is entirely eliminated,—the taste of dishes prepared from it resembling those prepared from farina manufactured from a fine grade of white wheat. The product can be prepared for serving by adding water to it and cooking it for from ten to fifteen minutes to form a porridge or breakfast food, or can be made sufficiently thick to permit it to be sliced or molded cold and then fried as a dish similar to fried mush, or it can be used as a vegetable substitute by dressing it with hot gravies or various kinds of dressings, or in the preparation of desserts by mixing it with fruits or fruit juices, spices and flavorings as desired, to make many delicious varieties of cobblers, soufflés, puddings, etc.

I claim:

1. As a new article of manufacture, a food product composed of granular fragments of a coherent mass of finely-ground starchy material derived from maize, steam-cooked to a state of slight gelatinization and dried, characterized by a semi-transparent milk-white color and ready solubility in cooking and the absence of maize flavor.

2. The process of treating ground starchy material to form a food product which consists in treating said material with water to produce a moist friable mass, then flaking the moist material, then subjecting the flaked material to cooking by the operation of dry steam, afterward drying the cooked material, and then granulating the dried material.

3. The process of treating ground starchy material to form a food product which consists in treating said material with water to produce a moist friable mass, then flaking the moist material, then subjecting the flaked material to a cooking operation, then shredding the cooked material, then drying the shredded material, and then granulating the dried material.

4. The process of treating ground starchy material to form a food product which consists in treating said material with water to produce a moist cake, afterward subjecting the material to cooking by the operation of dry steam, and afterward granulating the cooked material.

FREDERICK G. LORENZEN.